(12) United States Patent
Chang et al.

(10) Patent No.: US 9,133,922 B2
(45) Date of Patent: Sep. 15, 2015

(54) LOAD ADJUSTABLE BALL SCREW DEVICE

(71) Applicant: Hiwin Technologies Corp., Taichung (TW)

(72) Inventors: Che Kang Chang, Taichung (TW); Zong Sian Jiang, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 361 days.

(21) Appl. No.: 13/792,433

(22) Filed: Mar. 11, 2013

(65) Prior Publication Data

US 2014/0251050 A1    Sep. 11, 2014

(51) Int. Cl.
*F16H 25/22* (2006.01)

(52) U.S. Cl.
CPC ........ *F16H 25/2219* (2013.01); *F16H 25/2209* (2013.01); *Y10T 74/19772* (2015.01)

(58) Field of Classification Search
CPC ..................... Y10T 74/19772; F16H 25/2214; F16H 25/2219; F16H 25/2209
See application file for complete search history.

(56) References Cited

U.S. PATENT DOCUMENTS

| | | | | |
|---|---|---|---|---|
| 3,156,133 A | * | 11/1964 | Anthony | 74/424.83 |
| 3,393,577 A | * | 7/1968 | Better | 74/424.72 |
| 5,193,409 A | * | 3/1993 | Babinski | 74/424.83 |
| 5,582,072 A | * | 12/1996 | Yamaguchi et al. | 74/441 |
| 5,697,252 A | * | 12/1997 | Yamaguchi et al. | 74/441 |
| 6,422,101 B2 | * | 7/2002 | Erikson et al. | 74/89.42 |
| 6,425,302 B2 | * | 7/2002 | Greubel | 74/424.87 |
| 6,681,651 B2 | * | 1/2004 | Fujita | 74/424.86 |
| 7,474,176 B2 | * | 1/2009 | Henningsson et al. | 333/231 |
| 7,523,682 B2 | | 4/2009 | Liao et al. | |
| 7,891,265 B2 | * | 2/2011 | Erikson et al. | 74/441 |
| 7,934,438 B2 | | 5/2011 | Chen et al. | |
| 8,051,736 B2 | | 11/2011 | Chen et al. | |
| 8,752,446 B2 | * | 6/2014 | Yamamoto et al. | 74/424.72 |
| 2004/0123691 A1 | * | 7/2004 | Hayashi | 74/424.83 |
| 2006/0027038 A1 | * | 2/2006 | Ohkubo et al. | 74/424.86 |
| 2008/0134822 A1 | * | 6/2008 | Pan et al. | 74/424.87 |
| 2010/0242651 A1 | * | 9/2010 | Shirai et al. | 74/424.83 |
| 2014/0251050 A1 | * | 9/2014 | Chang et al. | 74/424.87 |

* cited by examiner

*Primary Examiner* — David M Fenstermacher
(74) *Attorney, Agent, or Firm* — Charles E. Baxley (57) ABSTRACT

A ball screw device includes a screw engaged into two nut members for forming a ball guiding passage between the nut members and the screw member and for receiving and engaging with bearing members, and a load applying device is disposed on the screw member and disposed between the nut members and applies a load onto the nut members in order to force and move the nut members away from each other and so as to apply a force onto the ball bearing members and in order to stably anchor and retain the ball bearing members between the nut members and the screw member and in order to facilitate a movement between the nut members and the screw member.

10 Claims, 8 Drawing Sheets

LOAD ADJUSTABLE BALL SCREW DEVICE

BACKGROUND OF THE INVENTION

1. Field of the Invention

The present invention relates to a ball screw device, and more particularly to a ball screw device including a load adjusting or applying device for adjusting the load between two nut members of the ball screw device and for suitably adjusting the load applied from the nut members and the screw member to the ball bearing members and for suitably attaching or mounting or securing or anchoring or retaining or positioning the ball bearing members between the nut members and the screw member of the ball screw device.

2. Description of the Prior Art

Typical ball screw devices comprise a single nut member threaded onto an elongated bolt or screw member and rotatable and movable or adjustable along the screw member, one or more endless ball guiding passages formed in the ball screw device for slidably receiving ball bearing members, and one or more ball return pipes attached onto the ball screw device for guiding the ball bearing members to smoothly and suitably move through the endless ball guiding passages of the ball screw device.

For example, U.S. Pat. No. 7,523,682 to Liao et al., U.S. Pat. No. 7,934,438 to Chen et al., and U.S. Pat. No. 8,051,736 to Chen et al. disclose several of the typical ball screw return systems each comprising one or more ball return pipes engaged onto a nut member for guiding the ball bearing members to smoothly move through the endless ball guiding passage of the ball screw and nut combination.

However, the ball bearing members are simply disposed or engaged between the nut members and the screw member, and the nut members and the screw member may not be moved or adjusted relative to and forced onto the ball bearing members, and thus may not adjust the load applied from the nut members and the screw member to the ball bearing members, and thus may not suitably force and anchor or retain or position or secure the ball bearing members between the nut members and the screw member of the ball screw device.

The present invention has arisen to mitigate and/or obviate the afore-described disadvantages of the conventional ball screw devices.

SUMMARY OF THE INVENTION

The primary objective of the present invention is to provide a ball screw device including a load adjusting or applying device for applying and/or adjusting the load between two nut members of the ball screw device and for suitably adjusting the load or the force applied from the nut members and the screw member to the ball bearing members and for suitably attaching or mounting or securing or anchoring or retaining or positioning the ball bearing members between the nut members and the screw member of the ball screw device.

In accordance with one aspect of the invention, there is provided a ball screw device comprising an elongated screw member including a helical groove formed therein, a first nut member and a second nut member each including a screw hole formed therein for receiving and engaging with the screw member, and each including a helical groove aligned with the helical groove of the screw member for forming a ball guiding passage between the first and the second nut members and the screw member, a plurality of bearing members engaged in the ball guiding passage between the first and the second nut members and the screw member, and a load applying device disposed on the screw member and disposed between the first and the second nut members and applying a load onto the first and the second nut members in order to force and move the first and the second nut members away from each other and in order to apply a force onto the ball bearing members and in order to solidly and stably anchor and retain the ball bearing members between the nut members and the screw member and in order to facilitate a rotational or sliding movement between the nut members and the screw member.

The load applying device includes a first ring member and a second ring member disposed between the first and the second nut members and contacted with each other, and the first ring member includes a projection extended outwardly therefrom and engaged with the first nut member, and the second ring member includes a projection extended outwardly therefrom and engaged with the second nut member for forcing the nut members to apply the force onto the ball bearing members.

The first and the second ring members each include at least one second projection extended outwardly therefrom and engaged with the first and the second nut members respectively for further applying a force onto the nut members respectively and for further forcing the nut members to apply the force onto the ball bearing members.

The load applying device includes a securing member fastened to the first and the second ring members in order to secure the first and the second ring members together. The first and the second ring members each include a recess formed therein for receiving and engaging with the securing member, and the securing member is stably or solidly secured to the first and the second ring members with screws or fasteners in order to solidly and stably secure the first and the second ring members together.

The first and the second nut members each include a deflecting member having a bore formed therein for receiving and engaging with the screw member, the first and the second ring members are disposed between the deflecting members of the first and the second nut members. The deflecting members of the first and the second nut members each include one or more deflecting pathways formed therein for receiving and engaging with the ball bearing members respectively.

The deflecting members of the first and the second nut members each include a notch formed therein for receiving and engaging with the projections of the first and the second ring members respectively. The notches of the deflecting members of the first and the second nut members are formed in an outer peripheral portion of the deflecting members respectively.

The first and the second nut members each include a dust cap having a bore formed therein for receiving and engaging with the screw member, the dust caps are engaged with the deflecting members of the first and the second nut members respectively and each include a tongue extended into the bore of and engaged into the helical groove of the screw member.

The dust caps each include a notch formed therein for receiving and engaging with the projections of the first and the second ring members respectively. The notches of the dust caps of the first and the second nut members are formed in an outer peripheral portion of the dust caps respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
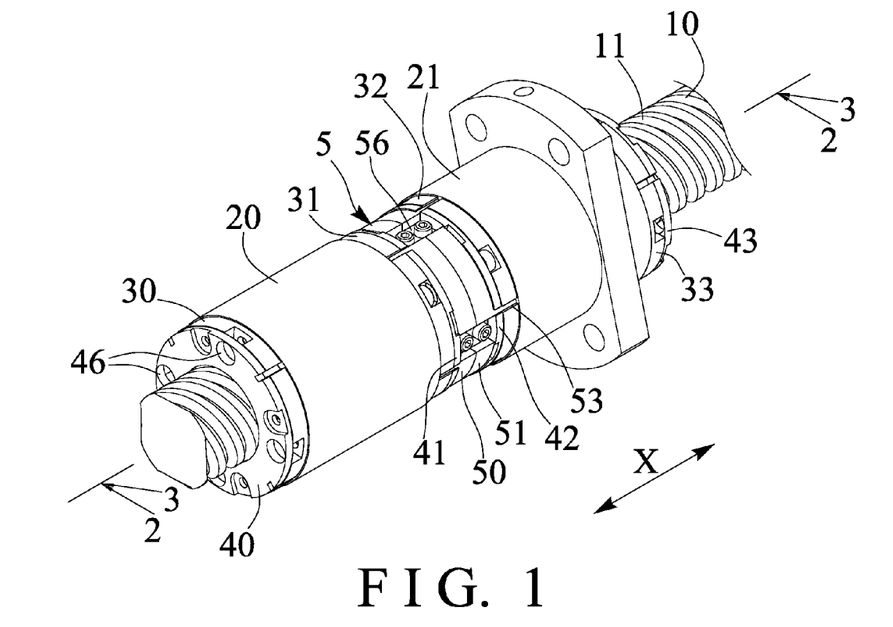
FIG. 1 is a partial perspective view of a ball screw device including a load adjusting or applying device in accordance with the present invention.
Figure 2:
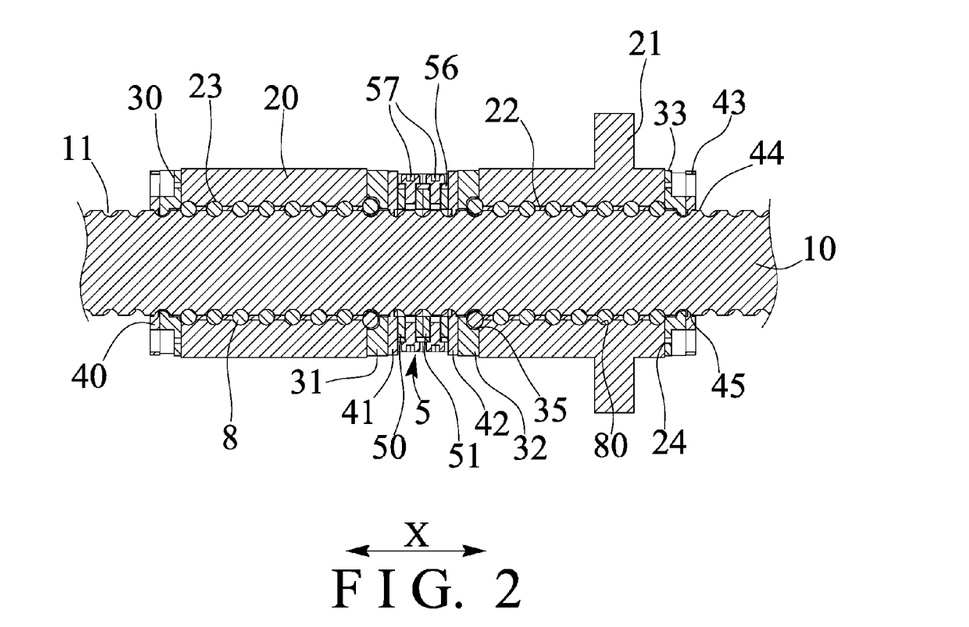
FIG. 2 is a partial cross sectional view of the ball screw device taken along lines 2-2 of FIG. 1.
Figure 3:
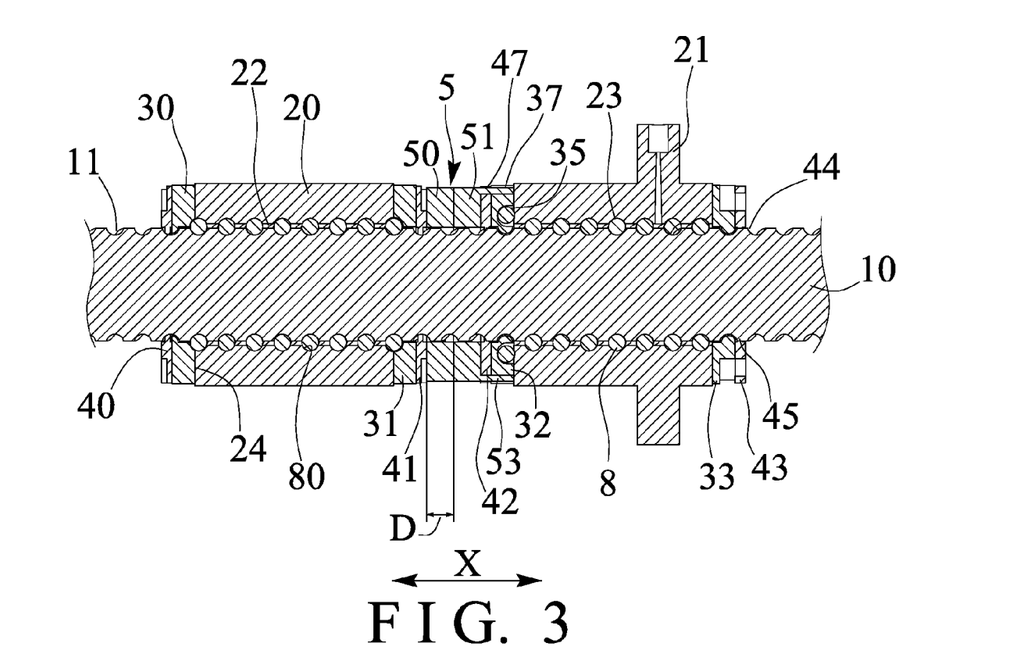
FIG. 3 is a partial cross sectional view of the ball screw device taken along lines 3-3 of FIG. 1.

Referring to the drawings, and initially to FIGS. 1-3, a ball screw device in accordance with the present invention comprises an elongated bolt or screw member 10 including one or more helical threaded portions or grooves 11 formed therein, such as formed on the outer peripheral portion thereof for threading or receiving or engaging with the roller or ball bearing members 8, and one or more (such as two) nut members 20, 21 each including a screw hole 22 formed therein for receiving or engaging with the screw member 10 and for allowing the nut members 20, 21 to be pivoted or rotated or adjusted and moved along the screw member 10, and each of the nut members 20, 21 including one or more helical threaded portions or grooves 23 formed therein for defining the screw hole 22 of the respective nut member 20, 21 and for receiving or engaging with the ball bearing members 8.

For example, the helical threaded portions or grooves 11 of the screw member 10 and the helical threaded portions or grooves 22 of the nut members 20, 21 are directed toward each other or aligned with each other for forming or defining one or more endless ball guiding passages 80 in the ball screw device (FIGS. 2, 3) or between the nut members 20, 21 and the screw member 10 and for slidably receiving or engaging with the ball bearing members 8 and thus for allowing the nut members 20, 21 to be smoothly pivoted or rotated and moved along the screw member 10. The nut members 20, 21 each further include one or more channels or grooves or conduits (not illustrated) longitudinally formed therein and formed through the length of the nut members 20, 21 and opened through the two end surfaces or portions 23 thereof and equally spaced from each other.

Figure 5:
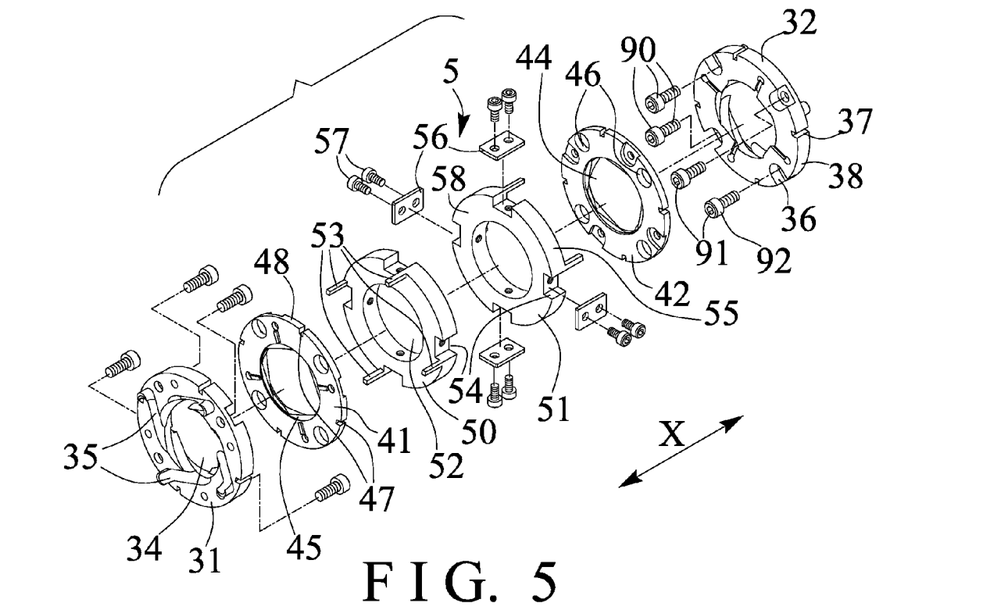
FIG. 5 is an exploded view the load adjusting or applying device of the ball screw device.
Figure 6:
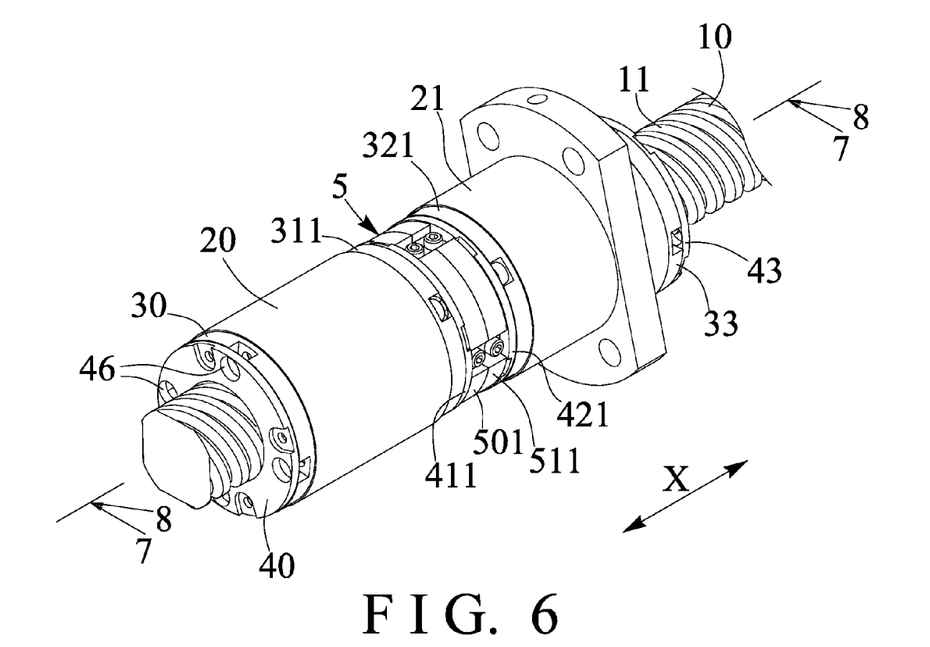
FIG. 6 is another partial perspective view similar to FIG. 1, illustrating the other arrangement of the load adjusting or applying device of the ball screw device.
Figure 7:
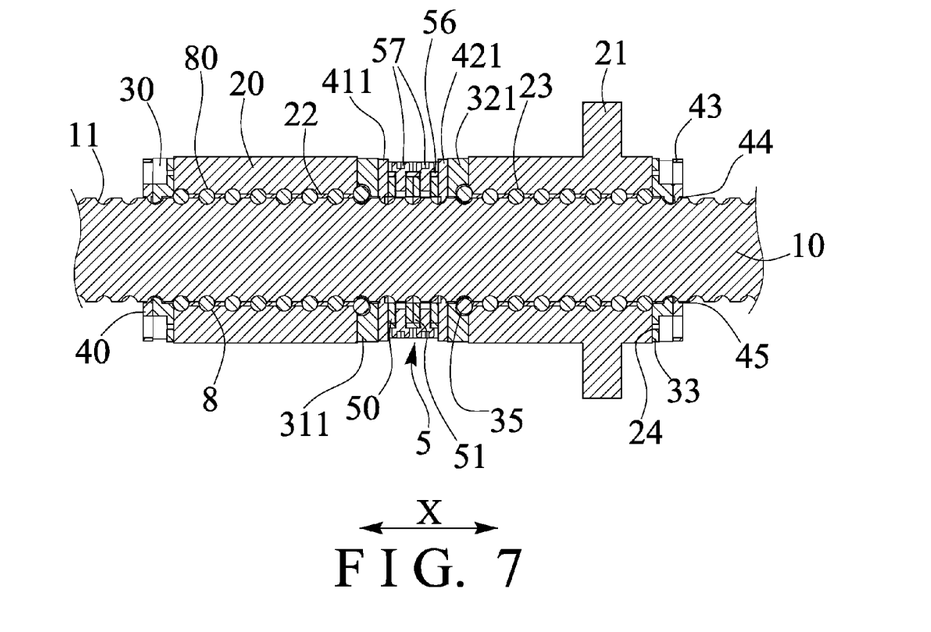
FIGS. 7, 8 are partial cross sectional views of the ball screw device taken along lines 7-7, and 8-8 of FIG. 6 respectively.
Figure 8:
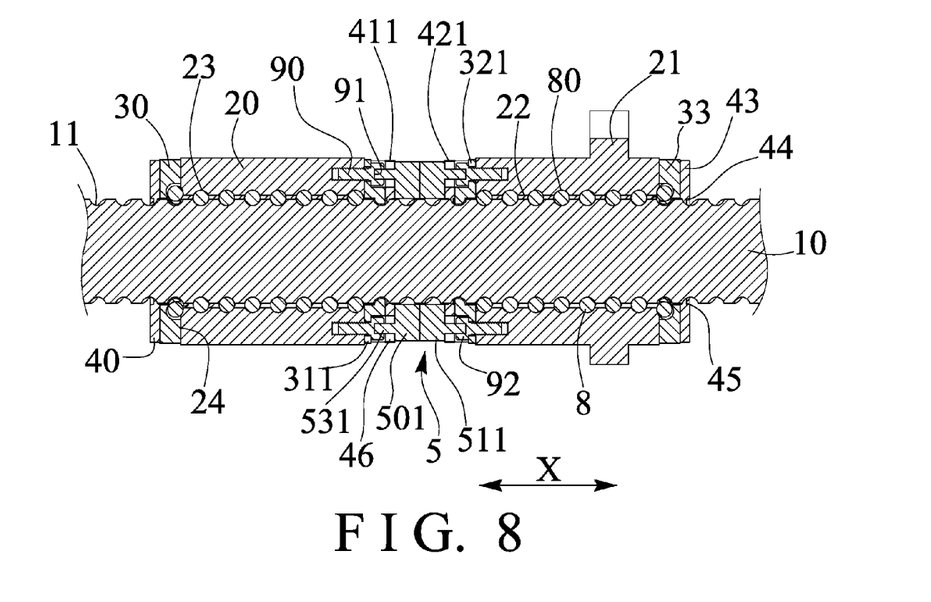
Figure 9:
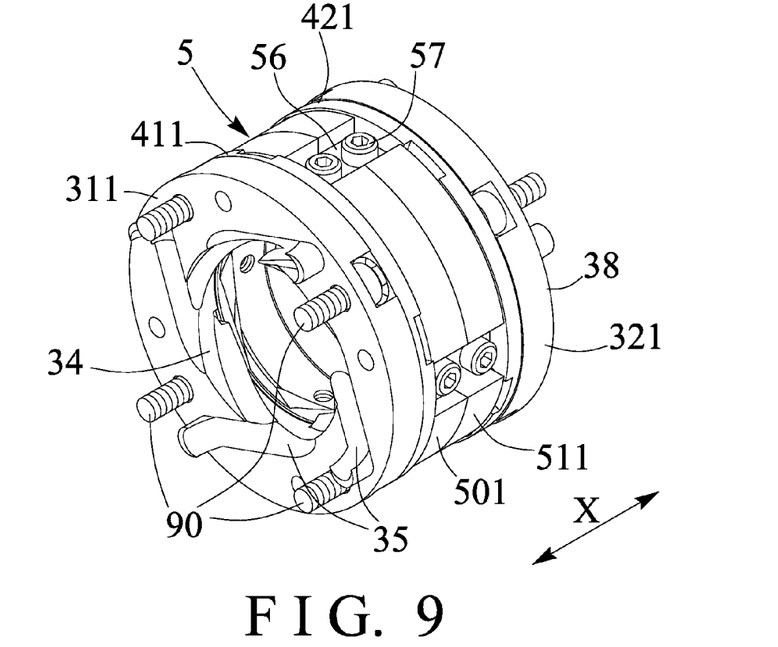
FIG. 9 is a perspective view illustrating the load adjusting or applying device of the ball screw device as shown in FIGS. 6-8.
Figure 10:
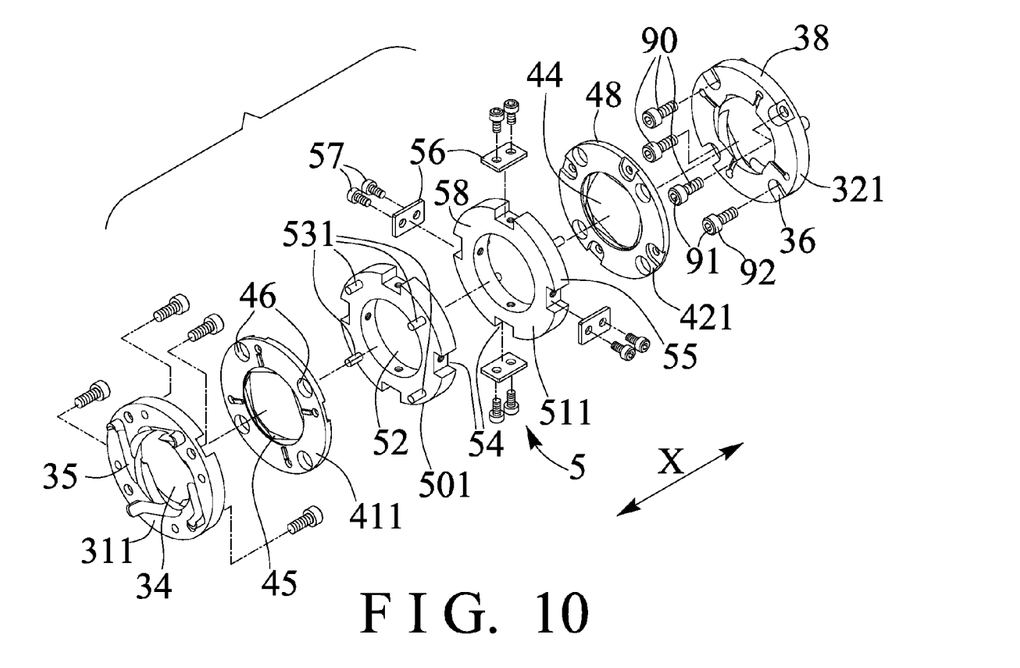
FIG. 10 is an exploded view the load adjusting or applying device of the ball screw device as shown in FIGS. 6-9.
Figure 11:
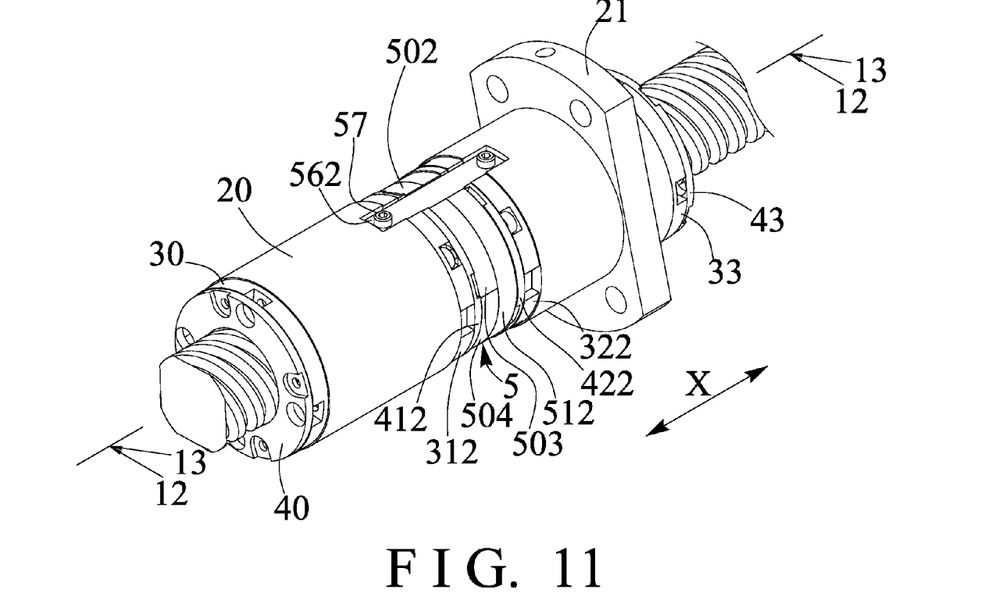
FIG. 11 is a further partial perspective view similar to FIGS. 1 and 6, illustrating the further arrangement of the ball screw device.
Figure 12:
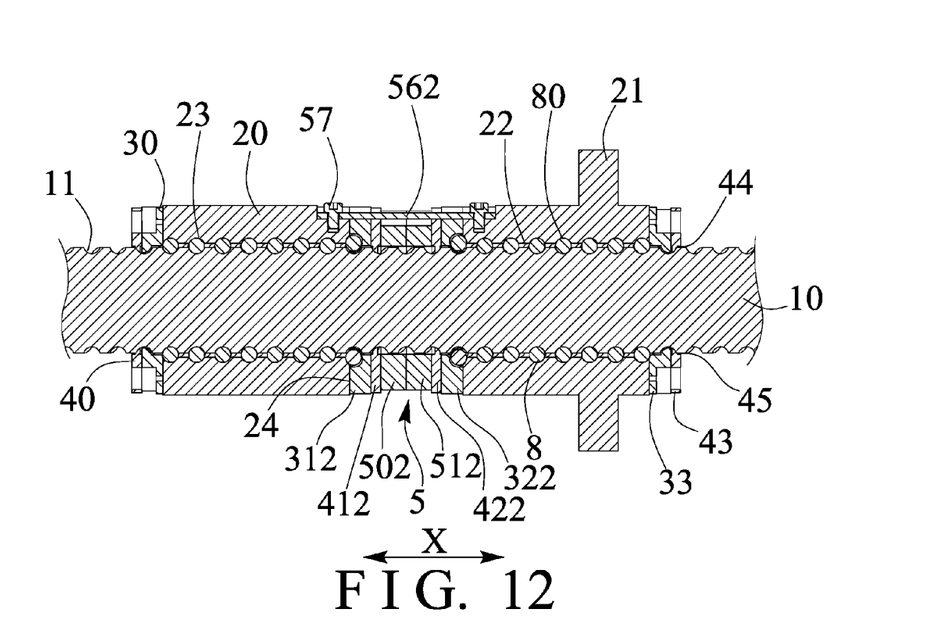
FIGS. 12, 13 are partial cross sectional views of the ball screw device taken along lines 12-12, and 13-13 of FIG. 11 respectively.
Figure 13:
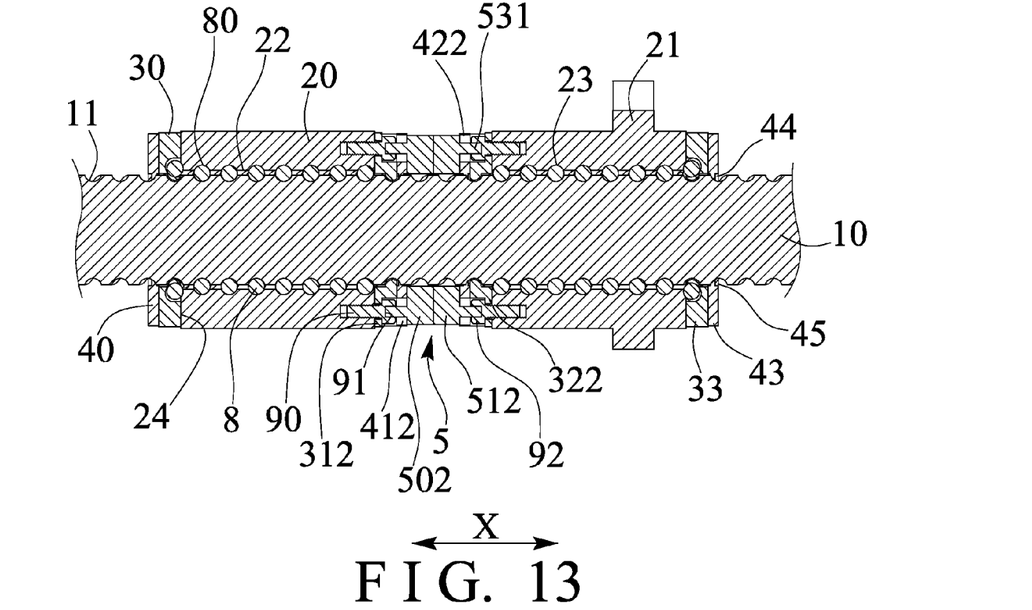
Figure 14:
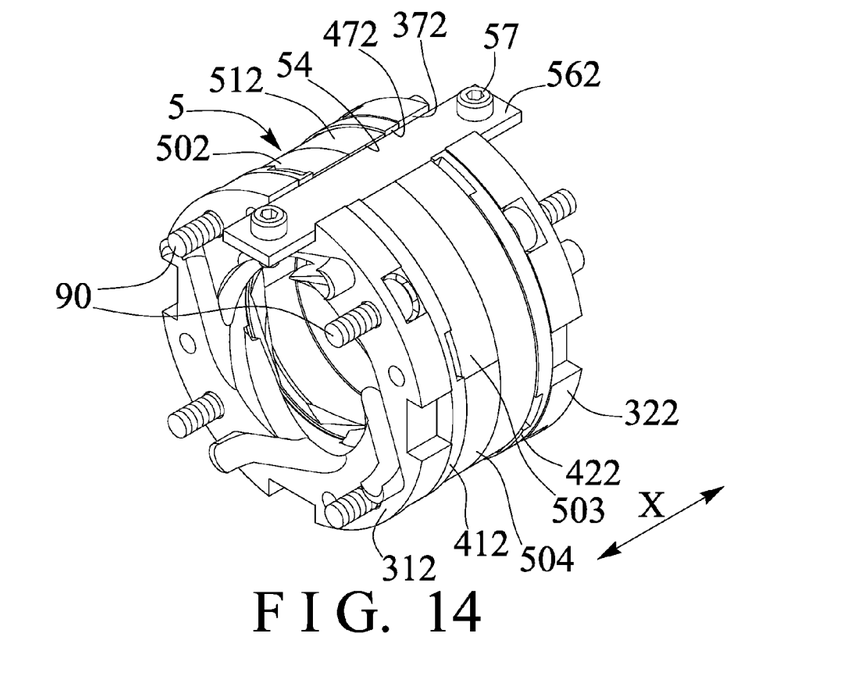
FIG. 14 is a perspective view illustrating the load adjusting or applying device of the ball screw device as shown in FIGS. 11-13.
Figure 15:
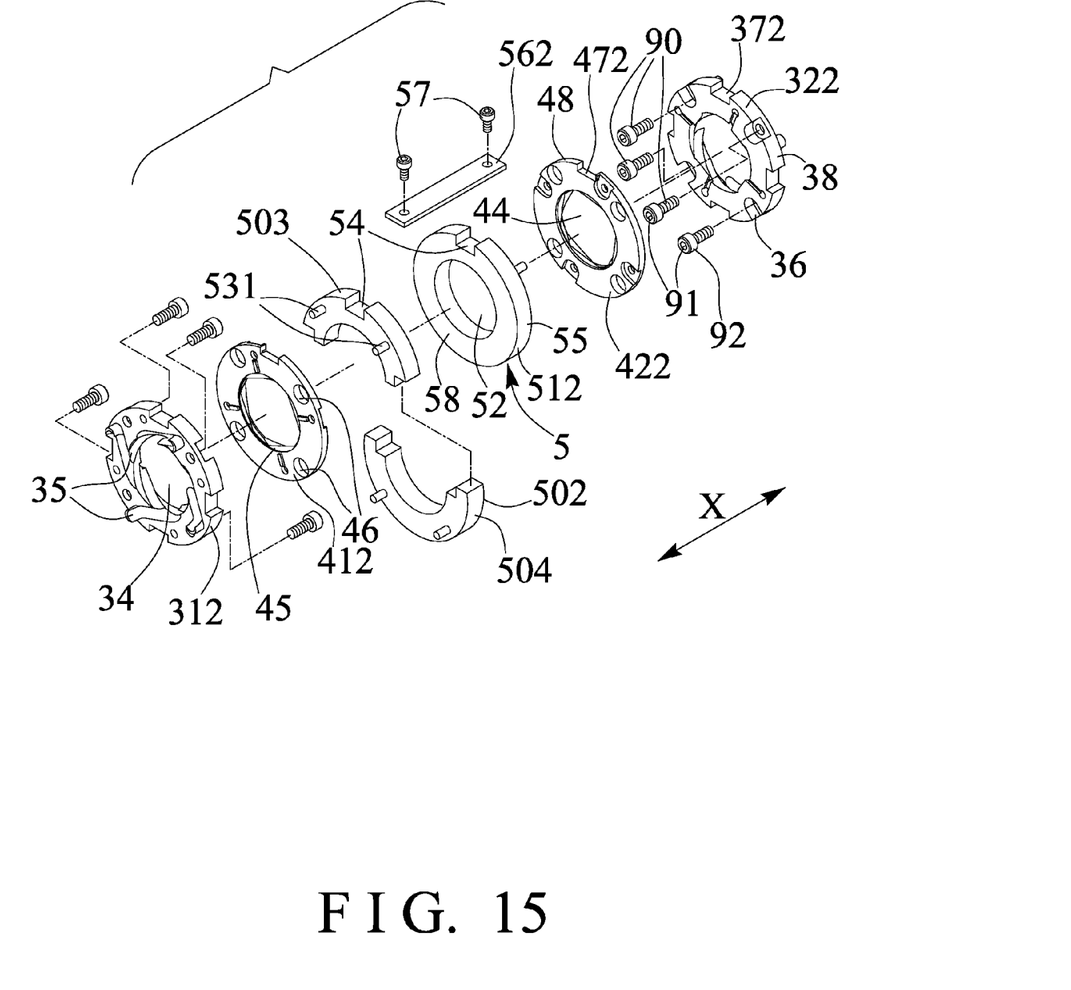
FIG. 15 is an exploded view the load adjusting or applying device of the ball screw device as shown in FIGS. 11-14.

The nut members 20, 21 each further include two end or cover or cap or deflecting member 30, 31; 32, 33 each having a bore 34 formed therein for receiving or engaging with the screw member 10, and disposed or attached or mounted or secured to the end portions 23 of the nut members 20, 21 with latches or fasteners 90 respectively, and the fasteners 90 each include a recessed non-circular engaging hole 91 formed in the head 92 thereof (FIG. 5) for selectively engaging with the wrenches or screw drivers or other driving tool members or elements (not illustrated) which may be used to pivot or rotate or drive the fasteners 90 relative to the deflecting member 30, 31; 32, 33 and/or the nut members 20, 21 in order to solidly and stably attach or mount or secure the deflecting member 30, 31; 32, 33 to the end portions 23 of the nut members 20, 21 respectively.

Figure 4:
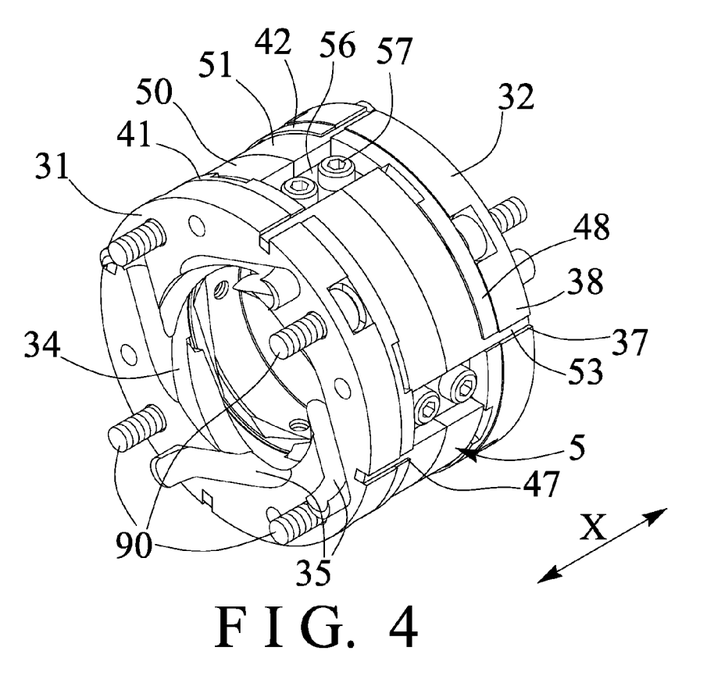
FIG. 4 is a perspective view illustrating the load adjusting or applying device of the ball screw device.

The deflecting member 30, 31; 32, 33 each include one or more deflecting pathways 35 formed therein (FIGS. 4, 5) and equally spaced from each other and directed to or aligned with and communicative with the corresponding conduits (not illustrated) and the helical threaded portions or grooves 22 of the nut members 20, 21 for forming or defining the endless ball guiding passages 80 in the ball screw device and for allowing the ball bearing members 8 to be guided to suitably and smoothly move through the conduits (not illustrated) and the helical threaded portions or grooves 22 of the nut members 20, 21 respectively. The above-described structure or configuration for the screw member 10 and the nut members 20, 21 and the deflecting member 30, 31; 32, 33 is typical and is not related to the present invention and will not be described in further details.

It is preferable, but not necessarily that the deflecting member 30, 31; 32, 33 each include one or more depressions 36 formed therein and equally spaced from each other for receiving or engaging with the heads 92 of the fasteners 90 respectively, and each include two or more recesses or notches 37 formed in the outer peripheral portion 38 thereof (FIGS. 4, 5) and also equally spaced from each other. The nut members 20, 21 each selectively or optionally include two dust caps 40, 41; 42, 43 each having a bore 44 formed therein for receiving or engaging with the screw member 10, and the dust caps 40, 41; 42, 43 are disposed beside or outside and contacted or engaged with the deflecting member 30, 31; 32, 33 respectively, and each include a lip or tongue 45 extended into the bore 44 thereof and partially extended or engaged into the helical threaded portions or grooves 11 of the screw member 10 for dust cleaning or preventing purposes.

The dust caps 40, 41; 42, 43 each include two or more orifices or openings 46 formed therein and equally spaced from each other and directed to or aligned with and communicative with the corresponding depressions 36 of the deflecting member 30, 31; 32, 33 respectively for receiving or engaging with the fasteners 90 respectively, and each further include two or more recesses or notches 47 formed in the outer peripheral portion 48 thereof (FIGS. 4, 5) and also equally spaced from each other and directed to or aligned with and communicative with the corresponding notches 37 of the deflecting member 30, 31; 32, 33 respectively. The nut members 20, 21 thus each include two deflecting member 30, 31; 32, 33 and/or two dust caps 40, 41; 42, 43 disposed or attached or mounted or secured to the end portions 23 of the nut members 20, 21 respectively.

The ball screw device further comprises a load adjusting or applying device 5 disposed or attached or mounted or secured onto the screw member 10, and including two body or ring members 50, 51 each having a bore 52 formed therein for receiving or engaging with the screw member 10, and the ring members 50, 51 are disposed beside each other and contacted or engaged with each other, and the ring members 50, 51 each include two or more extensions or projections 53 laterally extended outwardly therefrom and engaged into or with the notches 37 of the deflecting member 30, 31; 32, 33 and/or the notches 47 of the dust caps 40, 41; 42, 43 respectively for connecting or coupling the ring members 50, 51 to the nut members 20, 21 respectively and for allowing the ring members 50, 51 to be pivoted or rotated in concert with the nut members 20, 21 and the deflecting members 30, 31; 32, 33 and the dust caps 40, 41; 42, 43 respectively.

The ring members 50, 51 each further include one or more orifices or openings or notches or depressions or recesses 54 formed therein, such as formed on the outer peripheral portion 55 thereof, and the recesses 54 of the ring members 50, 51 are aligned with and communicative with each other for receiving or engaging with an anchoring or retaining or positioning or attaching or mounting or fastening or coupling or securing member 56 which is fastened or secured to the ring members 50, 51 with latches or fasteners 57 in order to anchor or couple or secure the ring members 50, 51 together (FIGS. 1, 2, 4) and thus for allowing the ring members 50, 51 to be pivoted or rotated in concert with the nut members 20, 21 and the deflecting members 30, 31; 32, 33 and the dust caps 40, 41; 42, 43 altogether.

The inner sides or back surfaces or portions 58 of the ring members 50, 51 are contacted or engaged with each other, and the projections 53 of the ring members 50, 51 are extended away from each other and extended toward the nut members 20, 21 respectively for contacting or engaging with the respective nut member 20, 21 (FIG. 3) and for applying a load onto the respective nut member 20, 21 along or in the longitudinal axis (X) and thus for slightly moving or pushing or forcing the nut members 20, 21 away from each other also along or in the longitudinal axis (X) in order to apply a force onto the ball bearing members 8 and so as to solidly and stably attach or mount or secure or anchor or retain the ball bearing members 8 between the nut members 20, 21 and the screw member 10 and in order to facilitate the pivoting or rotational and/or sliding movement between the nut members 20, 21 and the screw member 10.

It is to be noted that the ring members 50, 51 may be milled or cut or ground or machined to different thickness (D, FIG. 3) in order to adjust the spacing distance between the nut members 20, 21, for example, when the ring members 50, 51 are machined to include a relatively greater thickness, the nut members 20, 21 may be moved or pushed or forced away from each other for a relatively greater distance in order to apply a relatively greater force onto the ball bearing members 8. On the contrary, when the ring members 50, 51 are machined to include a relatively decreased or smaller thickness, the nut members 20, 21 may be moved or pushed or forced away from each other for a relatively decreased or smaller distance in order to apply a relatively decreased or smaller or less force onto the ball bearing members 8, such that the load applying onto the ball bearing members 8 from the nut members 20, 21 may be obtained and adjusted.

In operation, as shown in FIGS. 1 and 3, the projections 53 of the ring members 50, 51 of the load applying device 5 may be directly contacted or engaged with the respective nut members 20, 21, or may be indirectly contacted or engaged with the fasteners 90, particularly the engaging holes 91 in the heads 92 of the fasteners 90 of the nut members 20, 21 in order to apply the load or force onto the nut members 20, 21 and so as to slightly move or push or force the nut members 20, 21 away from each other in order to apply the force onto the ball bearing members 8, and so as to solidly and stably attach or mount or secure or anchor or retain the ball bearing members 8 between the nut members 20, 21 and the screw member 10.

Alternatively, as shown in FIGS. 6-10, the deflecting members 311, 321 and the dust caps 411, 421 may include no notches formed in the outer peripheral portion 48 thereof, and the projections 531 of the ring members 501, 511 may be extended or engaged into or through the openings 46 of the dust caps 411, 421 respectively for directly contacting or engaging with the respective nut member 20, 21, or for contacting or engaging with the fasteners 90, particularly the engaging holes 91 in the heads 92 of the fasteners 90 of the respective nut member 20, 21 in order to apply a load onto the nut members 20, 21 and so as to slightly move or push or force the nut members 20, 21 away from each other and in order to apply a force onto the ball bearing members 8, and so as to solidly and stably attach or mount or secure or anchor or retain the ball bearing members 8 between the nut members 20, 21 and the screw member 10.

Further alternatively, as shown in FIGS. 11-15, the deflecting members 312, 322 and the dust caps 412, 422 and the ring members 502, 512 may each include one or more orifices or openings or notches or depressions or recesses 372, 472, 54 formed therein, such as formed on the outer peripheral portion 38, 48, 55 thereof and aligned with each other for receiving or engaging with an anchoring or retaining or positioning or attaching or mounting or fastening or coupling or securing member 562 which is fastened or secured to the nut members 20, 21 with latches or fasteners 57 in order to anchor or couple or secure the nut members 20, 21 together and thus for allowing the ring members 502, 512 to be pivoted or rotated in concert with the nut members 20, 21 and the deflecting members 312, 322 and the dust caps 412, 422 altogether. The ring members 512, 502 each may include two or more portions or segments 503, 504 secured together.

Accordingly, the ball screw device in accordance with the present invention includes a load adjusting or applying device for applying or adjusting the load between two nut members of the ball screw device and for suitably adjusting the load or the force applied from the nut members and the screw member to the ball bearing members and for suitably attaching or mounting or securing or anchoring or retaining or positioning the ball bearing members between the nut members and the screw member of the ball screw device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
an elongated screw member including a helical groove formed therein,
a first nut member and a second nut member each including a screw hole formed therein for receiving and engaging with said screw member, and each including a helical groove aligned with said helical groove of said screw member for forming a ball guiding passage between said first and said second nut members and said screw member,
a first deflecting member and a second deflecting member each including a bore formed therein for receiving and engaging with said screw member, and disposed on end portions of said first nut member and secured to said first nut member with fasteners, said first and said second deflecting members each including at least one deflecting pathway formed therein and communicating with said helical groove of said first nut member for forming an endless ball guiding passage in said ball screw device, said second deflecting member including a notch formed therein, a third deflecting member and a fourth deflecting member each including a bore formed therein for receiving and engaging with said screw member, and disposed on end portions of said second nut member and secured to said second nut member with fasteners, said third and said fourth deflecting members each including at least one deflecting pathway formed therein and communicating with said helical groove of said second nut member for forming an endless ball guiding passage in said ball screw device, said third deflecting member including a notch formed therein, a plurality of bearing members engaged in said ball guiding passage between said first and said second nut members and said screw member, and a load applying device disposed on said screw member and disposed between said first and said second nut members and applying a load onto said first and said second nut members in order to force and move said first and said second nut members away from each other and in order to apply a force onto said ball bearing members, said load applying device including a first ring member and a second ring member disposed between said second deflecting member of said first nut member and said third deflecting member of said second nut member, said first and said second ring members of said load applying device being contacted with each other, and said first ring member including a projection extended outwardly therefrom and engaged through said notch of said second deflecting member and engaged with said first nut member, and said second ring member including a projection extended outwardly therefrom and engaged through said notch of said third deflecting member and engaged with said second nut member.

2. The ball screw device as claimed in claim 1, wherein said first and said second ring members each include at least one second projection extended outwardly therefrom and engaged with said first and said second nut members respectively.

3. The ball screw device as claimed in claim 1, wherein said load applying device includes a securing member fastened to said first and said second ring members in order to secure said first and said second ring members together.

4. The ball screw device as claimed in claim 3, wherein said first and said second ring members each include a recess formed therein for receiving and engaging with said securing member, and said securing member is secured to said first and said second ring members with fasteners.

5. The ball screw device as claimed in claim 1, wherein said first and said second nut members each include a deflecting member having a bore formed therein for receiving and engaging with said screw member, said first and said second ring members are disposed between said deflecting members of said first and said second nut members.

6. The ball screw device as claimed in claim 5, wherein said deflecting members of said first and said second nut members each include a notch formed therein for receiving and engaging with said projections of said first and said second ring members respectively.

7. The ball screw device as claimed in claim 6, wherein said notches of said deflecting members of said first and said second nut members are formed in an outer peripheral portion of said deflecting members respectively.

8. The ball screw device as claimed in claim 5, wherein said first and said second nut members each include a dust cap having a bore formed therein for receiving and engaging with said screw member, said dust caps are engaged with said deflecting members of said first and said second nut members respectively and each include a tongue extended into said bore of and engaged into said helical groove of said screw member.

9. The ball screw device as claimed in claim 8, wherein said dust caps each include a notch formed therein for receiving and engaging with said projections of said first and said second ring members respectively.

10. The ball screw device as claimed in claim 9, wherein said notches of said dust caps of said first and said second nut members are formed in an outer peripheral portion of said dust caps respectively.

* * * * *